(12) United States Patent
Shi et al.

(10) Patent No.: US 8,568,849 B2
(45) Date of Patent: Oct. 29, 2013

(54) SURFACE TREATED FILM AND/OR LAMINATE

(76) Inventors: Ming Kun Shi, Arcadia, CA (US); Daniel L. Holguin, Fullerton, CA (US); Kai Li, Diamond Bar, CA (US); Prakash Mallya, Sierra Madre, CA (US); Richard L. Sandt, Brunswick, OH (US)

(*) Notice: Subject to any disclaimer, the term of this patent is extended or adjusted under 35 U.S.C. 154(b) by 284 days.

(21) Appl. No.: 12/784,160

(22) Filed: May 20, 2010

(65) Prior Publication Data

US 2010/0297376 A1    Nov. 25, 2010

Related U.S. Application Data

(60) Provisional application No. 61/179,872, filed on May 20, 2009.

(51) Int. Cl.
- B32B 27/00 (2006.01)
- B32B 27/40 (2006.01)
- B32B 27/30 (2006.01)
- B32B 27/34 (2006.01)

(52) U.S. Cl.
USPC ............ 428/41.7; 428/411.1; 428/423.1; 428/500; 428/474.4; 428/447; 428/336

(58) Field of Classification Search
USPC ........ 428/411.1, 423.1, 500, 474.4, 447, 336, 428/41.7
See application file for complete search history.

(56) References Cited

U.S. PATENT DOCUMENTS

| | | | | |
|---|---|---|---|---|
| 5,130,353 A | * | 7/1992 | Fischer et al. | 524/43 |
| 5,185,390 A | * | 2/1993 | Fischer et al. | 524/43 |
| 6,025,068 A | * | 2/2000 | Pekala | 428/315.5 |
| 6,383,644 B2 | | 5/2002 | Fuchs | |
| 7,053,167 B2 | | 5/2006 | Ito et al. | |
| 7,166,156 B2 | * | 1/2007 | Parrinello et al. | 106/287.3 |
| 7,189,456 B2 | * | 3/2007 | King | 428/412 |
| 7,235,619 B2 | | 6/2007 | Morimoto et al. | |
| 2004/0071980 A1 | | 4/2004 | McBain et al. | |
| 2004/0091692 A1 | * | 5/2004 | Parrinello et al. | 428/315.5 |
| 2005/0009945 A1 | * | 1/2005 | Wenning et al. | 522/148 |
| 2006/0068122 A1 | | 3/2006 | Kanouni et al. | |
| 2008/0026576 A1 | | 1/2008 | Shenai-Khatkhate et al. | |
| 2009/0186198 A1 | | 7/2009 | McGuire | |

FOREIGN PATENT DOCUMENTS

| | | |
|---|---|---|
| EP | 1371685 | 12/2003 |
| GB | 872421 | 7/1961 |
| WO | 2007/110324 | 10/2007 |

OTHER PUBLICATIONS

International Search Report dated Sep. 1, 2010 for Application No. PCT/US2010/035595 filed May 25, 2010.
Written Opinion dated Sep. 1, 2010 for Application No. PCT/US2010/035595 filed May 25, 2010.

* cited by examiner

Primary Examiner — Thao T. Tran

(57) ABSTRACT

A surface treatment for a protective plastic film and/or laminate is disclosed. Suitably, the surface treatment includes coating a major surface of the plastic film or laminate with a curable coating formulation wherein the one or more of the coating ingredients are diffused or migrated at least partially into the plastic film or plastic laminate. The migration of coating ingredients creates a gradual transition layer from the plastic film to the coating layer and leads to unique properties. Optionally, the surface treated plastic film is laminated to a release liner coated with a pressure sensitive adhesive (PSA) to form the aforementioned laminate.

37 Claims, 11 Drawing Sheets

SURFACE TREATED FILM AND/OR LAMINATE

BACKGROUND OF THE INVENTION

The present inventive subject matter relates generally to the art of protective films and/or laminates. Particular relevance is found in connection with adhesive sheets' useful for protecting various surfaces to which the adhesive sheets are applied, e.g., such as the surfaces of automotive bodies, consumer electronics, and accordingly the present specification makes specific reference thereto. However, it is to be appreciated that aspects of the present inventive subject matter are also equally amenable to other like applications.

Protective films and/or laminates of various types are generally known. For example, U.S. Pat. No. 6,383,644 to Fuchs discloses one such multilayer sheet. Additionally, the published U.S. patent application of McGuire (Pub No.: US 2008/0286576 A1) also discloses a multilayer protective sheet. Both of the foregoing references are incorporated by reference herein in their entirety.

Notwithstanding prior attempts to develop protective films and/or laminates, there remains a desire for a protective film and/or laminate which performs suitably in accordance with one or more evaluation criteria, e.g., such as: good chemical resistance, good scratch and impact resistance, non-stick and non-wetting properties, good stain resistance, anti-graffiti and anti-fouling properties, good weather resistance, a low degree of yellowing over time, good optical clarity for see-through applications, a high degree of flexibility for conforming to non-planar surfaces, etc.

Accordingly, a new and/or improved protective film and/or laminate is disclosed which addresses the above-referenced problem(s) and/or others.

SUMMARY OF THE INVENTION

In accordance with one embodiment, a surface treated protective film or laminate is provided.

In accordance with another embodiment, a method for surface treating a protective film or laminate is provided.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENT(S)

Figure 1:
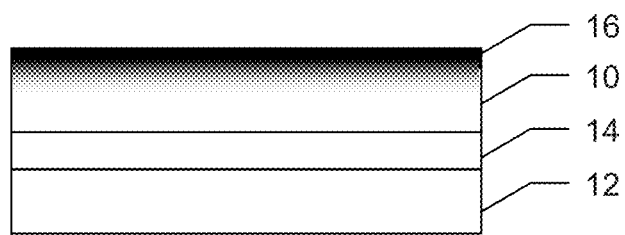
FIG. 1 is diagrammatic illustration showing an exemplary construction of a surface treated film and/or laminate in accordance with aspects of the present inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

In general, the present specification discloses a new protective film or laminate that has at least one major surface of a plastic substrate treated with a suitable material to enhance the properties of the protective film or laminate while retaining a sufficient portion of the pristine plastic substrate property, such as flexibility and/or extensibility. In particular, the surface treatment proposed herein is distinguished from an otherwise conventional top coating in that a substantial portion of the material applied during the surface treatment does not ultimately remain extending above or sitting on top or proud of the upper surface of the underlying film or laminate so treated. That is to say, rather than forming a largely distinct layer with a well defined boundary on top of the underlying film or laminate, the coating material applied during the surface treatment significantly penetrates the matrix of the underlying film/laminate and/or fills valleys or depressions on the rough surface of the underlying film/laminate. The coating material used in the surface treatment generally includes a solvent based coating solution or dispersion. A coating solution refers to a clear liquid where the coating ingredients are either totally soluble in an organic solvent or water, or their size is smaller than the visible wavelength of light and do not scatter light. Nano-sized particles generally fall into this latter category. A coating dispersion refers to a coating liquid that appears cloudy either because the coating ingredients are not totally soluble in an organic solvent or water, or their size is larger than the visible wavelength of light and scatter light.

In practice, the solvent operates to expand the matrix of the underlying film or substrate material to facilitate penetration of one or more coating ingredient(s) into the film or substrate. Suitably, the solvent is selected to be compatible with the chosen film or substrate material in this fashion, and the coating materials are likewise chosen, e.g., based on physical size and/or other appropriate properties, to achieve the desire penetration in view of the film material and selected solvent. Preferably, in addition to the solvent, the coating materials used in the surface treatment include one or more of the following curable ingredients: monomer and oligomer, such as radiation curable (electron beam, gamma irradiation or ultraviolet including both free radical or cationic) or thermally curable monomer and oligomer, additives such as surfactant and defoamer, and small particle of organic compound, inorganic compound or hybrid organic-inorganic compound. These materials are small in size and easily penetrate into the matrix of the plastic film or laminate. Preferably the size of the monomer or oligomer or particle is less than 10 µm, more preferably less than 5 µm, and even more preferably less than 1 µm.

In one particularly suitable embodiment, the coating material used in the surface treatment comprises POSS (Polyhedral Oligomeric Silsesquioxanes) or other like nano-structured organic-inorganic hybrid material. For example, suitable silsesquioxane derivatives are disclosed in U.S. Pat. No. 7,235,619 issued Jun. 26, 2007 to Morimoto, et al. and U.S. Pat. No. 7,053,167 issued May 30, 2006 to Ito, et al., both of which are incorporated herein by reference in their entirety. POSS materials with various functionalities are available from Hybrid Plastics Inc. (Hattiesburg, Miss.).

In one embodiment, the surface treatment proposed herein comprises a POSS material applied to the underlying substrate or film in the form of a solvent based, UV (ultraviolet) curable solution. More specifically, in accordance with a first example treatment material, this solution contains a silsesquioxane compound dissolved in MIBK (Methyl Isobutyl Ketone) solvent with a 40% solid loading. For example, one such suitable solution is made by Chisso Corporation (Osaka, Japan) and is sold under the trade name Sila-Max™. A surface treated with such a solution exhibits a low surface energy (e.g., approximately 21.8 mN/cm), which leads to good chemical resistance while providing added properties such as non-stick and non-wetting properties, anti-graffiti and anti-fouling properties and a low coefficient of friction which also contributes to good scratch and impact resistance. The first example treatment material possesses excellent optical clarity, e.g., with less than approximately 1% haze, which is advantageous for applications that call for see-through properties. For example, when coated to a film with low porosity such as polyester or polycarbonate, the first example treatment material also possesses a high surface hardness (e.g., around 3H pencil hardness), which makes it highly impact resistant and well suited for surface protection, e.g., of automotive bodies, consumer electronics, and other products.

When a suitable, extensible polymeric film is surface treated as described herein (e.g., using the first example treatment material), such as by gravure coating, spray, flexography, slot die coating, roll coating or other suitable methods, the film or the laminate largely retains significant extensibility with improved optical clarity due to smoothing of the film surface by the treatment materials. Additionally, dramatic improvement is observed in chemical resistance, e.g., such as the resistance to used motor oil and to chemicals used for automotive body cleaning. These properties make the treated film and/or laminate very useful for applications in which the film or laminate is applied to objects having curved surfaces and/or other complex geometries (i.e., non-planar surfaces). For example, when the surface treated film or laminate is used as a protective sheet applied to the surface of an automobile body (e.g., to protect the paint or finish thereon against scratches and staining), a more pleasing appearance and/or other benefits are generally achieved when the film or laminate conforms to the contour of the automobile body. Of course, in alternate embodiment, other coating materials, e.g., as described herein, may also optionally be used for the surface treatment.

Optionally, the surface treatment described herein can be applied to any suitable substrates, e.g., including both rigid and flexible or extensible substrates. Examples substrates include but are not limited to plastics, glass, metal, ceramics, woods, composites, etc. Nevertheless, for application as a protective sheet to be applied to complex geometries, curved surfaces and/or other application which generally benefit from high conformability (e.g., such as a protective sheet for an automotive body surface), a flexible plastic film substrate is advantageous. Such plastic films include but are not limited to, e.g., polyurethanes, polyvinyl chloride, polyolefins, polyesters, polyamides, polyacrylates, polysilicones, etc. In one embodiment, a polyurethane (PU) film of about 150 to 200 µm in thickness is particularly suitable for such applications. For example, polyurethane films made by Deerfield Urethane, Inc. (Whately, Mass.) and sold under the trade name Dureflex® (referred to herein as the first sample or exemplary film material) and polyurethane films made by Argotec, Inc. (Greenfield, Mass.) and sold under the trade name ARGOTHANE® (referred to herein as the second sample or exemplary film material), have been found acceptable. Notably, the elastic property of the polyurethane film also provides additional cushion that benefits the impact resistance of the final film or laminate.

FIG. 1 illustrates a suitable construction in accordance with aspects of the present inventive subject matter. In the illustrated embodiment, a plastic film 10 is laminated to a release liner 12 coated with a pressure sensitive adhesive (PSA) 14. As shown, reference numeral 16 identifies a surface created via surface treatment of the plastic film 10 with the coating material as disclosed herein. Suitably, as discussed above, the film 10 is optionally a PU film. As can be see from FIG. 1, suitably the surface treatment of the film 10 creates a surface 16 which is not a distinct layer with respect to the film 10. That is to say, there is no strictly defined border between the surface 16 and the film 10 which separates the two into otherwise distinct layers. Rather, the surface 16 is formed by a chemical treatment of the film 10 such that the material composition gradually transitions from one material to the next.

The gradual transitioning nature of the coating materials contributes largely to the retention of the film flexibility/extensibility. In general, two mechanisms can be used to explain this gradual transition. First, the coating solvent is selected to have good compatibility with the polyurethane film. Accordingly, the solvent swells the polyurethane film and carries the solid coating materials from the surface treatment inside the matrix of the polyurethane film. The inclusion of the coating solids from the treatment in the PU film matrix increases the density of the sub-surface. Second, the outermost surface of the PU film, like all plastic materials, is generally rough on a nano-meter scale. Upon treatment with the coating material, the valley areas are filled with the coating materials, which also beneficially leads to a smoother surface. In any event, at least in part due to these two effects, as visible under magnification, the thickness and/or amount of the coating material from the treatment which remains above or proud of the top surface of the underlying substrate material is relatively small in view of the coating weight used to apply the treatment material—in fact, in some embodiments it may even be unperceivable.

The ability of a coating ingredient diffusing or migrating into a plastic film depends on many factors such as the physical size of the coating ingredient, the compatibility with the plastic film, etc. A coating ingredient of smaller size and/or having good affinity with the plastic film will diffuse faster than the ingredient that is larger and/or having poor affinity. Since a typical coating formulation contains several ingredients that are different in size and/or in affinity/compatibility with the plastic film, the composition of the coating materials that have diffused/migrated into the plastic film may be substantially different from the composition of the starting formulation. This in turn leads to a new composition for the coating layer that remains above the plastic film, different from the composition of the starting coating formulation as well.

Suitably, the surface treatment in one embodiment includes applying the surface treatment material at a dry coating thickness in the range of about 0.1 to 25 μm. In another embodiment, the surface treatment includes applying the surface treatment material at a dry coating thickness in the range of about 1 to 15 μm. In yet another example, the surface treatment includes applying the surface treatment material at a dry coating thickness in the range of about 4 to 10 μm. In any event, the resulting thickness of the coating material which is distinguishable from and/or remains extending above or sitting proud of the top surface of the substrate material is substantially less than the applied coating volume.

Again, the two effects described above lead at least in part to the relatively thin thickness of the surface treatment material which remains above the top surface of the underlying substrate. Accordingly, this relatively thin thickness along with the graduation transitioning nature contribute to the fact that the flexibility and/or extensibility of the treated film or laminate is largely retained even though the treatment materials (e.g., such as the Silia-Max™) are only more generally known for rigid surface applications due to their relatively high surface hardness. For example, in one embodiment, the treated film or laminate disclosed herein withstands at least 20% elongation without failing (i.e., cracking, breaking, clouding, etc.). In yet another embodiment, the treated film or laminate disclosed herein withstands at least 50% elongation without failing. And in still another embodiment, the treated film or laminate disclosed herein withstands at least 80% elongation without failing. However, depending on the coatweight of the material used for the surface treatment, the amount and/or type of curing, the composition of the underlying base film, and other factors, elongations of up to about 150% or even 300% may be achieved without failure of the treated laminate/film. In general, lower coat weight and/or higher penetration into the plastics film leads to higher extensibility. As used in this regard, failing refers to the start of loss of clarity and/or increase in haze, e.g., as exhibited by cracking, hazing or whitening.

Both the aforementioned effects also tend to enhance the surface reflectivity and gloss level of the resulting construction, e.g., as illustrated by a reduction in haze % (see Table 1) and an increase in the gloss value (see FIG. 2) for a 150 μm thick Dureflex® PU film treated with the first exemplary treatment solution. The haze % measurements were taken on a PU film after peeling off the PET carrier. For the gloss measurements, the PU film remained on the PET carrier.

TABLE 1

| Samples | Haze % |
|---|---|
| 150 μm thick 1$^{st}$ sample film untreated (Control) | 2.77 |
| 150 μm thick 1$^{st}$ sample film treated with 5 μm coat weight of 1$^{st}$ exemplary treatment solution | 2.03 |
| 150 μm thick1$^{st}$ sample film treated with 10 μm coat weight of 1$^{st}$ exemplary treatment solution | 1.91 |
| 150 μm thick 2$^{nd}$ sample film untreated (Control) | 1.70 |
| 150 μm thick 2$^{nd}$ sample film treated with 10 μm coat weight of 1$^{st}$ exemplary treatment solution | 1.59 |

Figure 2:
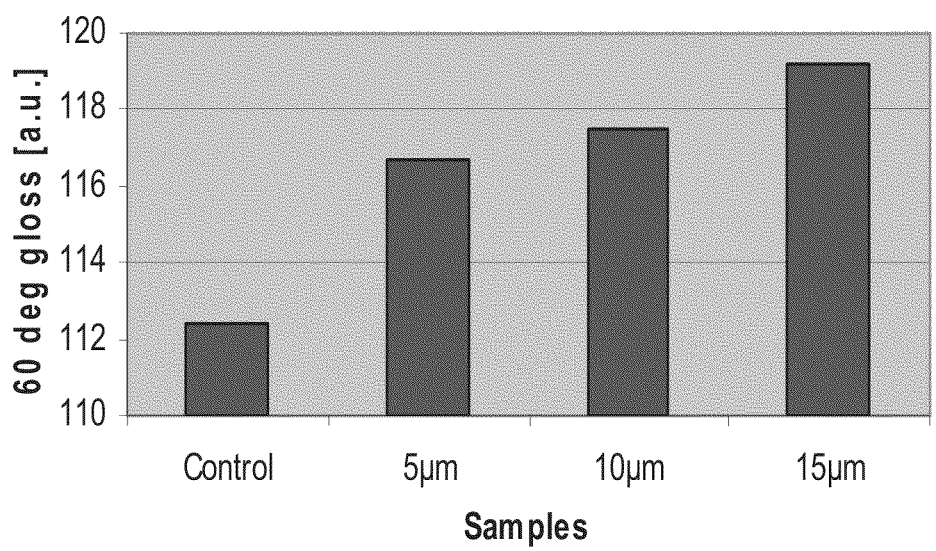
FIG. 2 is graph showing measured 60 degree gloss values for each of several tested sample films treated with exemplary treatment solutions prepared in accordance with the present inventive subject matter and comparative examples.

FIG. 2 illustrates gloss value measurements with illumination applied at a 60 degree angle of incidence. The listed samples represent 150 μm thick 1$^{st}$ sample films treated with the 1$^{st}$ exemplary treatment solution applied at the respective coat weights indicated. The listed control sample was untreated.

The gradual transition of the treatment material also acts to "hardens" the surface, which in turn may help eliminate the appearance of the "orange peel" effect frequently observed on flexible films.

Additionally, various tests were conducted to evaluate the stain resistance of film and/or laminate samples surface treated in accordance with one or more of the embodiments presented herein. These tests included subjecting the samples to various staining and/or fouling materials and/or conditions, e.g., such as motor oil, HCL, roofing tar, stain mixes for testing carpets, etc.

Figure 3:
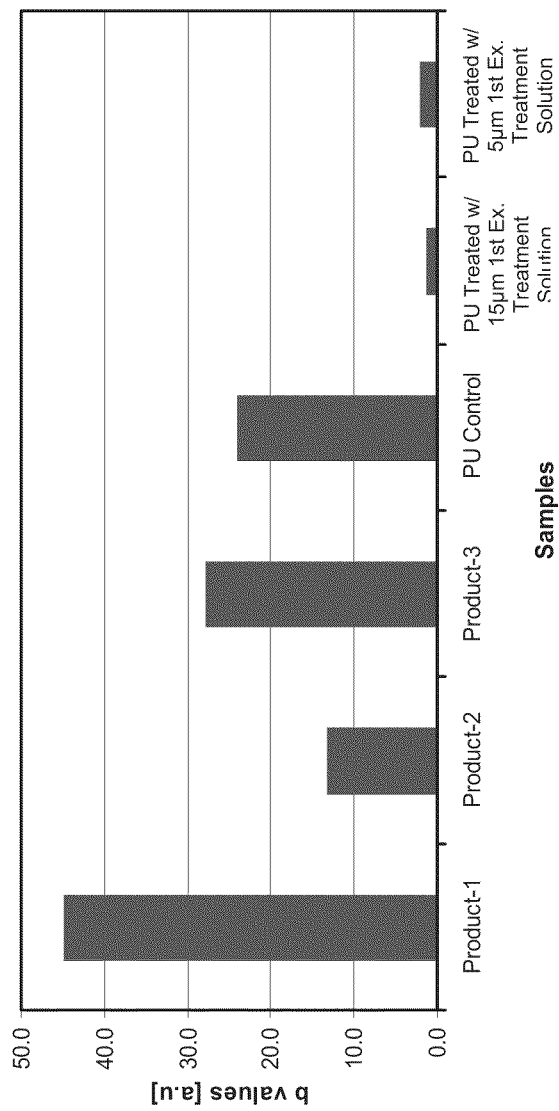
FIG. 3 is graph showing measured b values for each of several tested sample films treated with exemplary treatment solutions prepared in accordance with the present inventive subject matter and comparative examples after exposure to a used motor oil test.

In one exemplary experiment, a 150 μm thick 1$^{st}$ sample film laminated to a (PSA) on a release liner was surface treated with a 5 μm and a 15 μm (wet thickness) coat weight of the 1$^{st}$ exemplary treatment material disclosed herein, i.e., the Sila-Max™ coating material. The surface treated samples were dried in a thermal oven at about 80° C. for about 3 to 5 minutes and further cured by UV irradiation using a mercury lamp with 206 mJ/cm$^2$ irradiation energy, at a speed of 100 feet/min. After curing, the release liner was removed and the surface treated PU films were attached to aluminum (Al) plates via the PSA layer. To emulate the exposure to airborne motor oil and dirt from the pavement of the driving environment, the Al plates carrying the prepared samples were dipped in used motor oil (Pennzoil, 10W30) for 48 hours along with currently available commercial products for comparison. After the 48 hour test period, the samples were taken out of the used motor oil and thoroughly cleaned with detergent and water. The surface treated film samples were inspected and compared with the current commercial products to evaluate any changes in color (yellowing) as a result of the used motor oil test. FIG. 3 illustrates measured b values of the samples on an L a b color scale after subjecting the samples to the aforementioned used motor oil test. The listed samples represent 150 μm PU film treated with the 1$^{st}$ exemplary treatment solution applied at the respective coat weights indicated. The listed control sample was untreated. Also listed are commercially available products labeled Product-1, Product-2 and Product-3 for comparison. While pronounced color change (i.e., yellowing and/or staining) was observed for the commercial products and the untreated PU film, little color change was observed for the PU film treated with the $1^{st}$ exemplary treatment solution.

Figure 4:
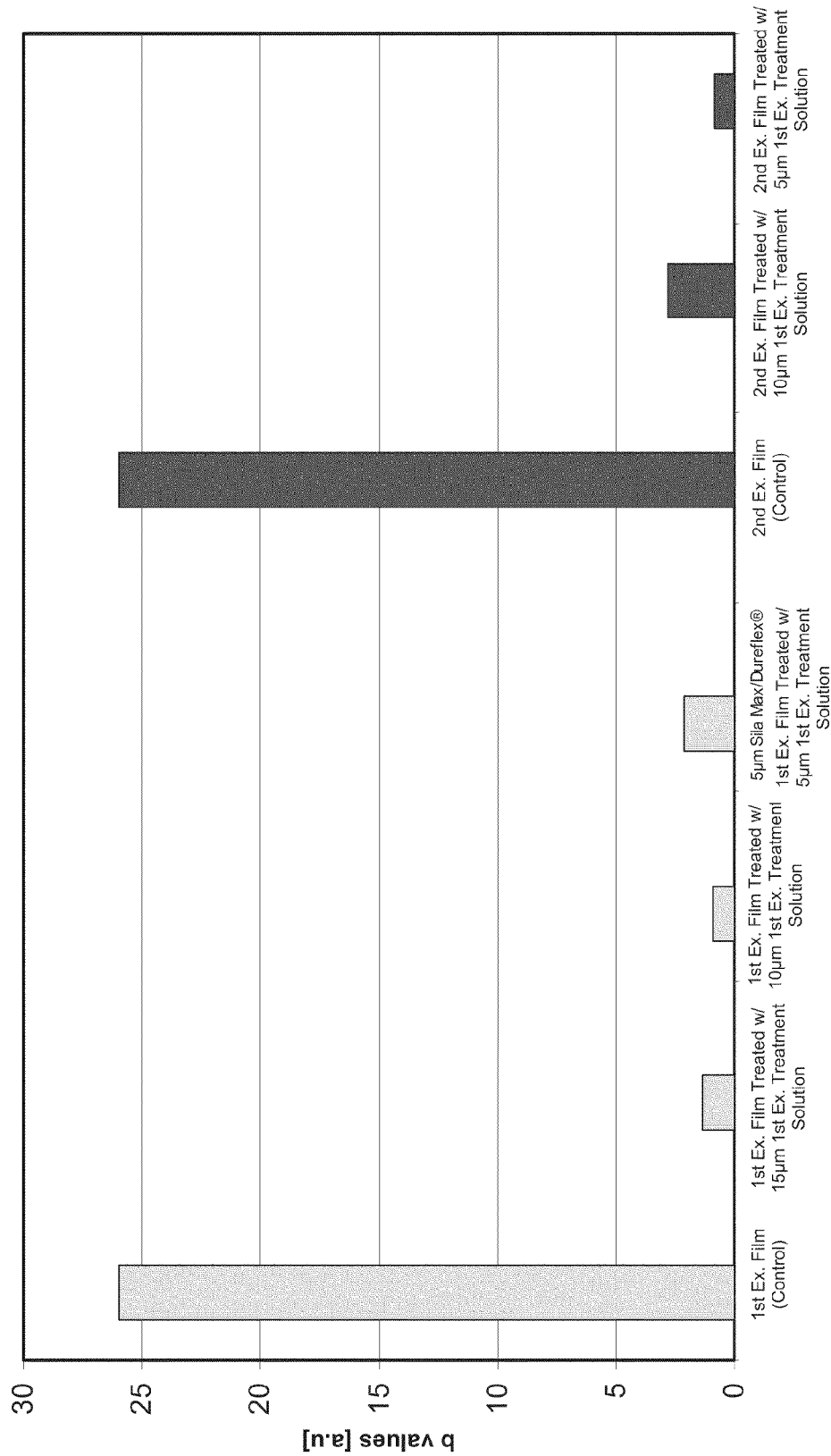
FIG. 4 is graph showing measured b values for each of several tested sample films treated with exemplary treatment solutions prepared in accordance with the present inventive subject matter and comparative examples after exposure to a used motor oil test.

In another experiment, 150 μm thick samples of the $1^{st}$ and $2^{nd}$ exemplary films were treated with the $1^{st}$ exemplary treatment solution, with wet thicknesses coating weights from 15 μm down to 5 μm. The samples were then dried at about 80° C. for about 3 to 5 minutes and further cured by UV using a mercury lamp with 206 mJ/cm² irradiation energy, at a speed of 100 feet/min. The treated samples were again tested in the used motor oil following the same procedure. The b values for both the control and treated PU samples are shown in FIG. 4. The control samples of the $1^{st}$ and $2^{nd}$ exemplary films have comparable b values, which were significantly reduced after the treatment with the $1^{st}$ exemplary treatment solution. The treated samples performed much better than the commercial products tested, even with 5 μm wet coating thickness. The b values decrease slightly by increasing the coating thickness from 5 μm to 10 μm, which has almost the same b value as the 15 μm sample.

FIG. 4 illustrates measured b values of the samples on a Lab color scale after subjecting the samples to the aforementioned used motor oil test. The listed samples represent 150 μm thick film in accordance with exemplary films 1 and 2 as indicated treated with the $1^{st}$ exemplary treatment solution applied at the respective coat weights indicated. The listed control samples were untreated.

Figure 5:
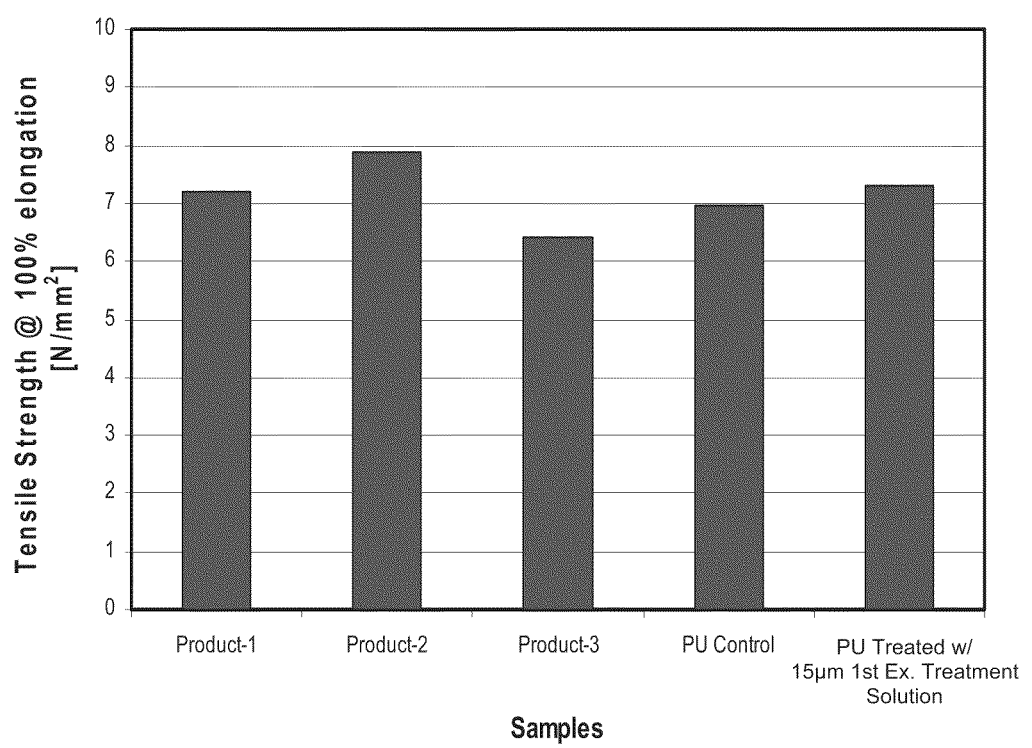
FIG. 5 is graph showing measured tensile stress at 100% elongation for each of several tested sample films treated with exemplary treatment solutions prepared in accordance with the present inventive subject matter and comparative examples.

The flexibility of a 150 μm thick $1^{st}$ exemplary film having, on the bottom surface, a 50 μm thick PSA layer, was treated with 15 μm wet coat weight of the $1^{st}$ exemplary treatment solution. After treatment, the tensile stress at 100% elongation was measured to evaluate its conformability. For comparison, the tensile properties of commercial products were also measured and are plotted in FIG. 5. The results for the commercial products are labeled Product-1, Product-2 and Product-3, and the result for an untreated 150 μm thick $1^{st}$ exemplary film (i.e., the Control) is also shown.

Due to its high flexibility and thin coating thickness, the surface treated film sample in accordance with aspects of the present inventive subject matter shows a stress at 100% elongation which is (i) comparable to that of the commercially available comparison sample Product-1, (ii) slightly lower than that of the commercially available comparison sample Product-2, and (iii) slightly higher than that of the commercially available comparison sample Product-3.

The impact resistance of the surface treated $1^{st}$ exemplary film having a PSA layer on the bottom surface was also evaluated using an appropriate testing method—namely a modified ASTM D968-93 established by ASTM International, originally known as the American Society for Testing and Materials (ASTM). More specifically, samples were prepared and tested as follows. The release liner of the laminate was first removed and the surface treated PU film was laminated to an Al panel through the PSA layer. To emulate the exposure to airborne stones and debris of the driving environment, the Al panel was firmly mounted on a heavy metal holder. Five pounds of a sand mixture with ⅜ to ½ inch in diameter particle size was used as the impact material. The sand mixture was poured from the top of a 3 meter long and 0.5 inch diameter stainless steel tube. The sand particles gained speed and upon exiting the tube, impacted on the sample carrying Al panel which was located at 3 inch from the bottom of the tube and positioned at a 45 degree angle. After all the sand mixture flowed out from the tube, the Al panel was removed from the heavy metal holder. After blowing off any loosely attached dust and/or other particles, the impacted area of the sample was inspected and compared to a currently available commercial product that had undergone the same testing. The result suggests that the impact resistance of the surface treated sample is comparable to the commercially available product.

Additionally, conventional gravelometer testing was conducted on film and/or laminate samples that were surface treated in accordance with one or more of the embodiments disclosed herein. The samples passed this testing conducted in accordance with industry accepted standards.

Figure 6:
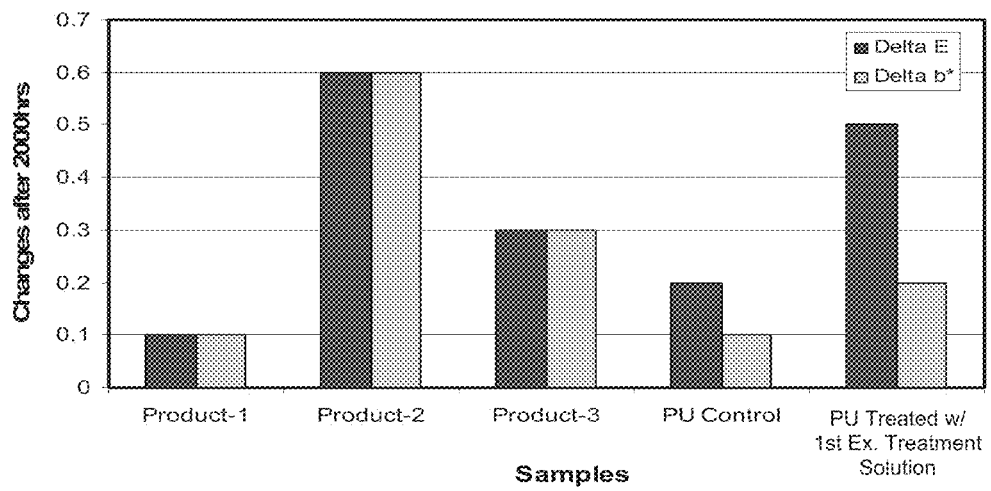
FIG. 6 is graph showing measured delta b and delta E values for each of several tested sample films treated with exemplary treatment solutions prepared in accordance with the present inventive subject matter and comparative examples after exposure to weatherometer testing.

Additionally, to emulate exposure to sunlight, UV Xenon weatherometer tests were performed on a 150 μm thick sample of the $1^{st}$ exemplary film treated with 15 μm wet coating weight of the $1^{st}$ exemplary treatment solution. Commercial products (i.e., Product-1, Product-2 and Product-3) were also tested along with an untreated sample of the $1^{st}$ exemplary film (i.e., the Control). The changes in the b* values (Δb*) and in the total color (ΔE) were measured before and after exposure to the testing. As shown in FIG. 6, very little changes are observed for all the samples after 2000 hours. In fact, any color variation that is below 1.0 is nearly unperceivable if at all by human eyes.

Figure 7:
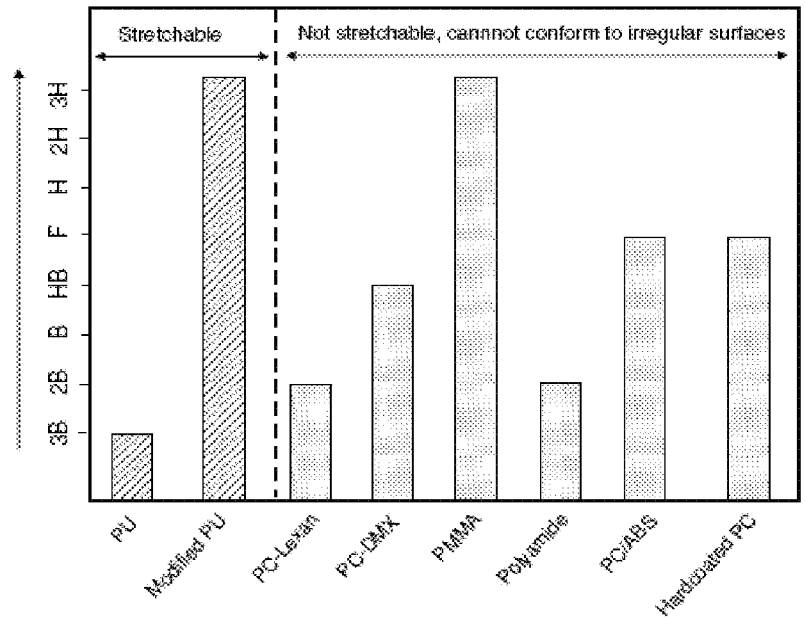
FIG. 7 is graph showing the pencil hardness and stretchability of different plastic films with and without a hard coat.

The first exemplary treatment solution (i.e., the Sila Max™ coating) has 3H pencil hardness according to technical data from the manufacturer. The $1^{st}$ and $2^{nd}$ exemplary PU films, on the other hand, have a pencil hardness of about 3B, which is several grades lower than the aforementioned coating. Yet, when the PU film was treated with the $1^{st}$ exemplary coating solution, the treated PU film substantially retains its flexibility and remains stretchable. Such contradictory properties are largely unexpected and/or unseen in the prior art. In FIG. 7 is compared the hardness and the stretchability of different plastic films with or without a hard coat. Here the term "stretchability" means that the plastic film can be elongated at room temperature by hands without failing. Commercially available stretchable plastic films such as PU, polyvinyl chloride, rubbers, and polyolefins all have very soft surfaces. Plastic films with harder surfaces such as acrylic and polycarbonate are not stretchable. The treated PU film in accordance with aspects of the present inventive subject matter effectively combines a very hard surface with a very soft plastic core, which is a result of gradual transition from the soft PU to a very hard coating. The penetration of coating materials into the plastic film or laminates also leads to other desired benefits, such as strong adhesion. The adhesion is particularly important when the coated film is subject to bending or has to conform to irregular surfaces, with or without stretching.

In yet another embodiment, the PU film surface was treated with treatment solutions that are thermally curable. These solutions each contained two parts, namely, a resin solution with 10% solids in a co-solvent of MEK (methyl ethyl ketone) and IPA (isopropyl alcohol), and a corresponding curing agent. The resin solution for the first thermally curable treatment solution had a viscosity of 0.90 mPa.S and the resin solution for the second thermally curable treatment solution had a viscosity of 0.93 mPa.S. Both curing agents were white solid powders. The thermal curable coating solutions were prepared by mixing 0.5 wt parts of the curing agent in 100 wt parts of the resin solution. To obtain a coating with high optical clarity, it is recommended that the dry thickness of the coating be less than 1 μm, as thicker coatings lead to a higher haze %.

150 μm thick samples of the $1^{st}$ and $2^{nd}$ exemplary films were treated with both the thermally curable treatment solutions described above with a 10 μm wet coating thickness.

The samples were then initially dried at about 60° C. for about 3 to 5 minutes to eliminate the solvent, followed by thermal curing at about 120° C. for about 1 minute. The surface treated films along with untreated control samples were evaluated for resistance to the used motor oil and for conformability. The results are shown in Table 2.

TABLE 2

| Samples | Tensile strength @100% elongation [N/mm$^2$] | Appearance at 100% elongation | b value (after used motor oil test) |
|---|---|---|---|
| 1$^{st}$ Exemplary Film Untreated (Control) | 9.4 | Clear | 26.0 |
| 1$^{st}$ Exemplary Film Treated with 1$^{st}$ Thermally Curable Treatment Solution | 6.0 | Clear | 4.7 |
| 1$^{st}$ Exemplary Film Treated with 2$^{nd}$ Thermally Curable Treatment Solution | 5.9 | Clear | 13.0 |
| 2$^{nd}$ Exemplary Film Untreated (Control) | 10.2 | Clear | 26.0 |
| 2$^{nd}$ Exemplary Film Treated with 1$^{st}$ Thermally Curable Treatment Solution | 6.2 | Clear | 1.4 |
| 2$^{nd}$ Exemplary Film Treated with 2$^{nd}$ Thermally Curable Treatment Solution | 5.6 | Clear | 2.1 |

As shown in Table 2, the tensile strength at 100% elongation is significantly reduced by treatment with both the thermally curable treatment solutions, which leads to an improvement in the conformability. No change in the optical clarity was noticeable after 100% elongation. The resistance to staining, as evidenced by their performance in the used motor oil test, for both exemplary films is significantly improved after treatment with both thermally curable treatment solutions, more so for the 2$^{nd}$ exemplary film than for the 1$^{st}$ exemplary film.

The PU film treated with the 1$^{st}$ exemplary treatment solution also showed a significant reduction in the surface energy as shown in Table 3, due to the low surface energy of the treatment materials. In fact, one of the properties of the 1$^{st}$ exemplary treatment solution is that the treated surface exhibits a concentration gradient across the thickness for the nano-particles, with more nano-particles being located on the outermost surface rather than in the sub-surface. It is theorized that during the coating process, the nano-particles migrate to the top surface prior to curing and are locked in place upon curing. The migration of the low surface energy components to the surface is associated with the natural force that has the tendency to minimize the surface energy. The low surface energy of the PU film created by the surface treatments described herein provides an excellent release surface.

TABLE 3

| Samples | Total surface energy [mN/cm] | Polar component [mN/cm] | Non-polar component [mN/cm] |
|---|---|---|---|
| 2$^{nd}$ Exemplary Film Untreated (Control) | 40.1 | 34.6 | 5.5 |
| 2$^{nd}$ Exemplary Film Treated with a 10 µm wet coat weight of the 1$^{st}$ Exemplary Treatment Solution | 22.1 | 21.0 | 1.1 |

The surface energy shown in Table 3 was obtained through contact angle measurements. The measurements were conducted on a NRL Contact Angle Goniometer and using D.I. water and Tricresylphosphate (TCP) testing liquids. The surface energy values were calculated using the Geometric Mean Model. The control PU film has a total surface energy of 40.1 mN/cm with a polar component of 34.6 mN/cm and non-polar component of 5.5 mN/cm. The total surface energy was significantly reduced after treatment with the 1$^{st}$ exemplary treatment solution, more so for the polar component than for the non-polar component.

The low surface energy property allows the treated film to be a self-wound, tape like laminate comprising a surface created via the surface treatment, a plastic substrate and a PSA layer. In this manner, the release liner or backing sheet is eliminated from the construction, e.g., shown in FIG. 1. Accordingly, this both reduces the cost and eliminates the waste of a release liner or other like backing materials.

In another embodiment, the surface treatment comprises a composite of the 1$^{st}$ exemplary treatment solution and an aliphatic urethane acrylate. In one example, a treatment solution was made by mixing the 1$^{st}$ exemplary treatment solution with an aliphatic urethane diacrylate in different weight ratios [w/w]. Mixing the 1$^{st}$ exemplary treatment solution with the urethane acrylate can significantly reduces the cost of the surface treatment solution (with the same amount of coating materials) and/or increases the solid content (i.e., the 1$^{st}$ exemplary treatment solution has 40% solid loading, while the acryate has 100% solid loading). Higher solid content is advantageous for coating a thicker film.

For example, a suitable urethane diacrylate is available from Sartomer Company, Inc. (Extom, Pa.) and sold under the product designation CN2285. Without adding a new or additional photoinitiator, the mixture of the 1$^{st}$ exemplary treatment solution and the foregoing urethane diacrylate can be UV cured at the same rate (i.e., at 100 feet/min. using a mercury lamp with 206 mJ/cm$^2$ irradiation energy) with up to about 75% wt of the urethane diacrylate in the formulation. Suitably, the photo curing agent contained in the 1$^{st}$ exemplary treatment solution is sufficient to cure the composite. Additional photoinitiator may be added upon further increase in the urethane diacrylate content in order to maintain the same curing rate.

In one example, a 15 µm wet coating weight or thickness of the aforementioned coating solutions (i.e., mixture of the 1$^{st}$ exemplary treatment solution and aliphatic urethane diacrylate) were used to surface treat a 200 µm thick sample of the 1$^{st}$ exemplary film. The samples were then dried at about 80° C. for about 3-5 min followed by UV curing at about 100 feet/min using a mercury lamp with about 206 mJ/cm$^2$ irradiation energy. The resistance to the used motor oils and the tensile stress at 100% elongation were evaluated and shown in FIG. 8 and FIG. 9, respectively. An untreated sample (i.e., the Control) was also tested and the results are likewise reported here.

Figure 8:
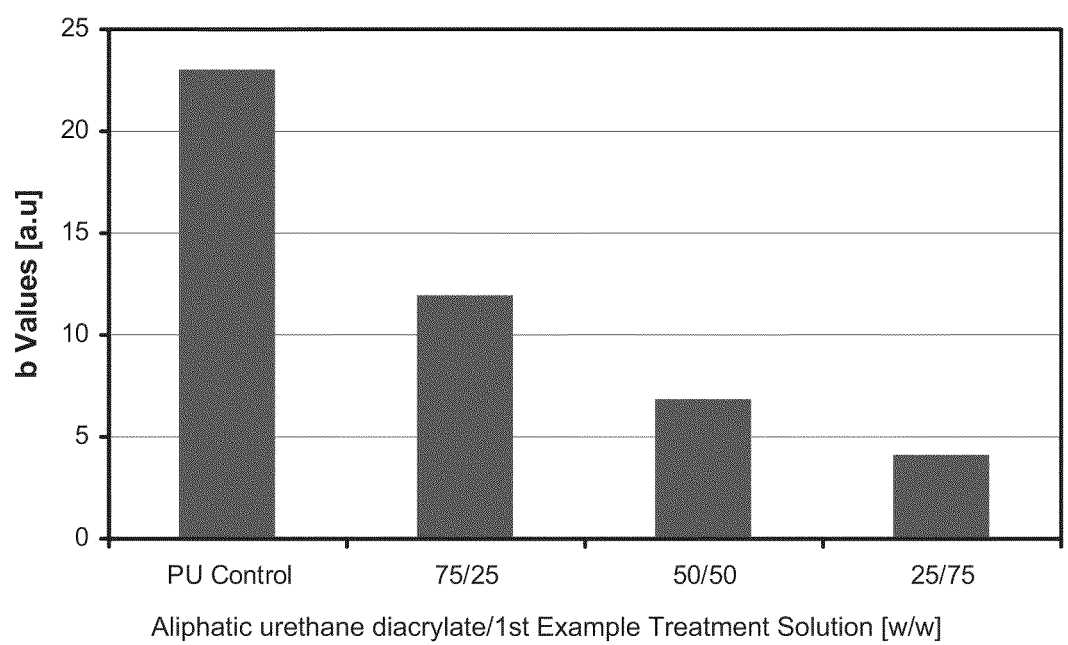
FIG. 8 is graph showing measured b values for each of several tested sample films treated with exemplary treatment solutions prepared in accordance with the present inventive subject matter and comparative examples after exposure to a used motor oil test.

As shown in FIG. 8, excellent stain resistance was obtained with up to 50% aliphatic urethane diacrylate (w/w) in the composition formulation, outperforming all commercial products shown in FIG. 3. The performance however became worse with further increases in the acrylate component.

Figure 9:
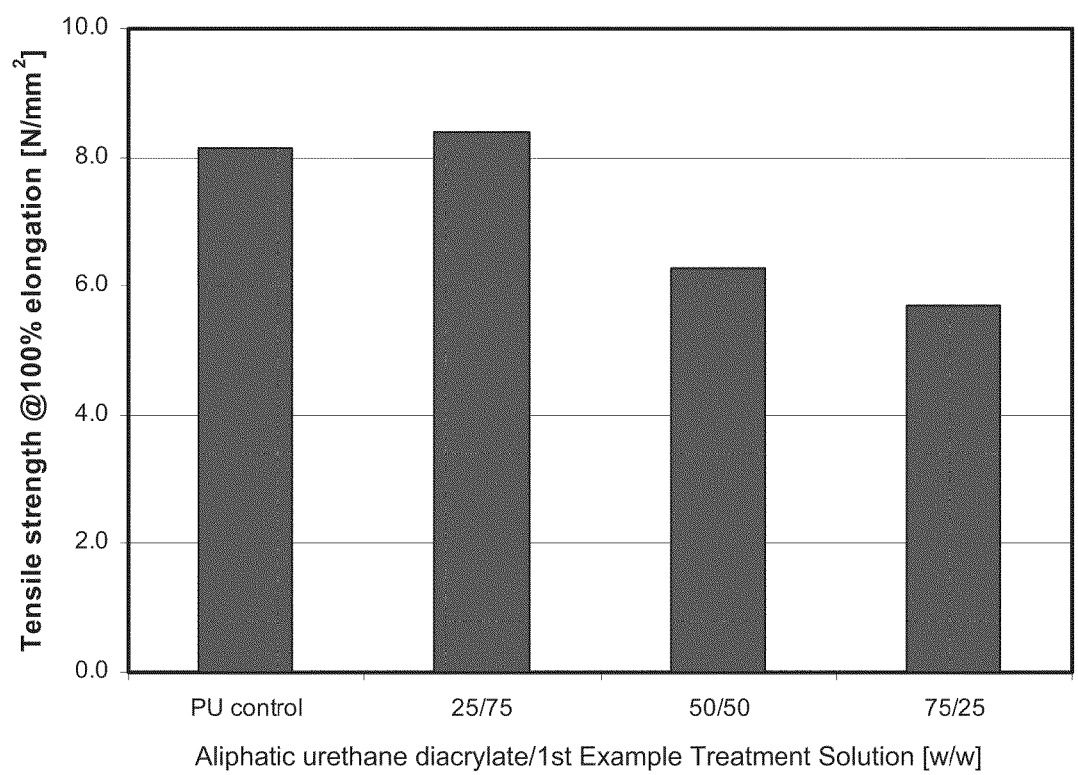
FIG. 9 is graph showing measured tensile stress at 100% elongation for each of several tested sample films treated with exemplary treatment solutions prepared in accordance with the present inventive subject matter and comparative examples.

FIG. 9 shows that the PU film treated with the composite coating of (aliphatic urethane diacrylate):(the 1$^{st}$ exemplary treatment solution)=25:75 weight ratio has comparable tensile stress as the untreated film. The tensile stress however decreases with further increase in this ratio, which will lead to improved conformability.

In yet another embodiment, the PU film surface was treated with another treatment solution comprising a different POSS material (i.e., a 2$^{nd}$ exemplary treatment solution). In this example, the coating solution was obtained from Hybrid Plastics (Hattiesburg, Miss.) and sold under the product designation POSS® Coat MA2310. This coating solution comprises a mixture of POSS nano-particles and acrylates. It is a 100% solid, irradiation curable solution. Again, a sample was prepared by surface treating a 200 μm thick sample of the 1$^{st}$ exemplary film with a 15 μm wet thickness coating of the foregoing solution and UV cured at 100 feet/min using a fusion lamp with 206 mJ/cm$^2$ irradiation energy. The resistance to the used motor oil of the PU film treated with the 2$^{nd}$ exemplary treatment solution showed a b value of 8.2, which is significantly better than the uncoated PU film (see, e.g., FIG. 4).

In practice, the coating or treatment solution formulation may contain inorganic particles, inorganic-organic hybrid particles and/or polymeric particles. Suitable inorganic particles include, for example, calcium carbonate, titanium dioxide, silica, alumina, zinc sulfide, zinc oxide, antimony oxide, barium sulfate, etc. Suitable organic-inorganic particles include materials derived from silsesquinoxane compounds. For example, many organic-inorganic hybrid particles of Polyhydral Oligomeric Silsesquinoxane (POSS) materials with a vast variety of functionalities are commercially available. Suitable organic particles include, for example, polyolefin, polyamide, polyester, and polyurethane particles. These particles can be used alone or in combinations.

In one example, an optically clear stretchable film was obtained via a treatment prepared by mixing a UV curable POSS containing material (available from Hybrid Plastics (Hattiesburg, Miss.) under the product designation Acrylo POSS Cage Mixture (MA0736) with an aliphatic urethane acrylate (available from Sartomer Inc. under the product designation (CN2285)) as shown in Table 4. The treatment solution was applied to a 200 μm thick sample of the 2$^{nd}$ exemplary PU film with 10 μm wet thickness. The coated PU film was dried at 80° C. for 5 min and UV cured using a mercury lamp at 200 mJ/cm$^2$ irradiation energy.

TABLE 4

| Components | % |
|---|---|
| MEK | 46.5 |
| Aliphatic urethane acrylate | 46.5 |
| POSS containing material | 4.6 |
| Benzophenone | 2.4 |
| Total | 100 |

The thus coated polyurethane film can be stretchable to more than 100% without noticeable change in the optical clarity. This result, compared to the PU film treated with POSS® Coat MA2310 described above, suggests that the presence of an organic solvent is important for the coating ingredients to penetrates into and maintain the flexibility of the treated PU film. The b value of the coated polyurethane film after dipping in a used motor oil for 2 days changed from 1.77 to 5.23.

In another example, a matte finish stretchable protective film was obtained by treatment with a solvent based dispersion comprising a polyamide based polymeric particle. In particular, the treatment included: MEK as the solvent; an ultra-fine polyamide powder having an average particle size of 5 μm (available under the designation Orgasol® 2001 UD Nat 2 from Arkema Inc.); a UV curable aliphatic urethane acrylate (i.e., CN2285 available from Sartomer Inc.); a UV curable POSS material (i.e., Acrylo POSS Cage Mixture (MA0736) obtained from Hybrid Plastics Inc.); and, Benzophenone (available from Sigma-Aldrich) as photoinitiator. The composition of each component is listed in Table 5.

TABLE 5

| Components | % |
|---|---|
| MEK | 41.0 |
| Aliphatic urethane acrylate | 41.0 |
| Ultra-fine polyamide powder | 11.8 |
| POSS containing material | 4.1 |
| Benzophenone | 2.1 |
| Total | 100 |

The coating dispersion was applied to a 2 mil Melinex™ PET substrate and a 200 μm 1st exemplary PU film with 15 μm wet thickness. The samples were dried at 80° C. for 5 min and UV cured using a mercury lamp at 200 mJ/cm$^2$ irradiation energy the 60 deg gloss and the stretchability of the coated film samples were measured and listed in Table 6.

TABLE 6

| PU | | PET | |
|---|---|---|---|
| 60 degree gloss | Stretchability | 60 degree gloss | Stretchability |
| 4.3 | >300% | 13 | Not stretchable |

The 60 deg gloss of the coating applied to the PU film is substantially lower than the same coating applied to the PET substrate, and the coated PU film remains stretchable up to more than 300% without cracking. It is theorized that the lower gloss value for the coating applied to the PU film is associated with the migration of the coating components into the PU film. When the coating is applied to the PU film, the solvent and other smaller molecules such as POSS® MA0736 and CN2285 quickly diffuse into the PU film. The polyamide particle, which is relatively large, is left behind. This leads to a coating layer with higher concentration of polyamide particles than in the starting coating composition. On the other hand, when the coating is applied to the PET film where little or no diffusion occurred, the coating layer remains uniform with the same concentration as the initial coating composition. This "concentrating" or "filtering" effect enabled by a non-uniform, differentiated diffusion of different coating ingredients into the plastic film allows to maximize surface related coating properties such as abrasion resistance, low gloss, anti-glare, chemical resistance, etc. On the other hand, a desired concentration of particles on the coating surface can be obtained using a coating formulation having lower concentration of particles than on the coating surface. As a result, the amount of particles in the coating formulation can be reduced and the coating formulation can be made with a lower viscosity.

In yet another example, a treatment solution was prepared with a 10% acrylic polymer (available under the designation Plexiglas V825 from Arkema Inc.) in 1-Methoxy-2-Propanol solvent. The solution was coated onto a 200 μm thick 2$^{nd}$ exemplary PU film with 15 μm wet thickness and dried at 80° C. for 5 min. The coated PU film thus obtained was optically clear. However, upon stretching, the treated PU film becomes hazy and cracks instantly. It is theorized that because of the large size of the acrylic polymer chain, the acrylic material was not able to diffuse into the PU film and consequently, the coating becomes hazy and cracks upon stretching.

Figure 10:
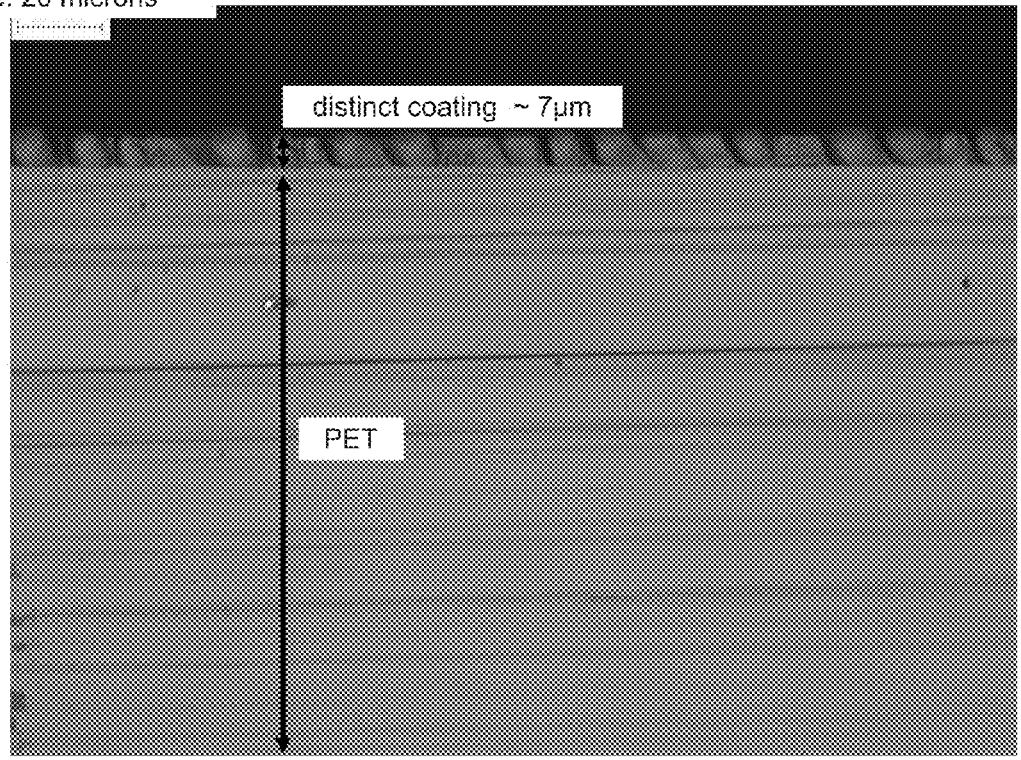
FIG. 10 is photomicrograph showing a comparative sample film treated with an exemplary treatment solution prepared in accordance with the present inventive subject matter.
Figure 11:
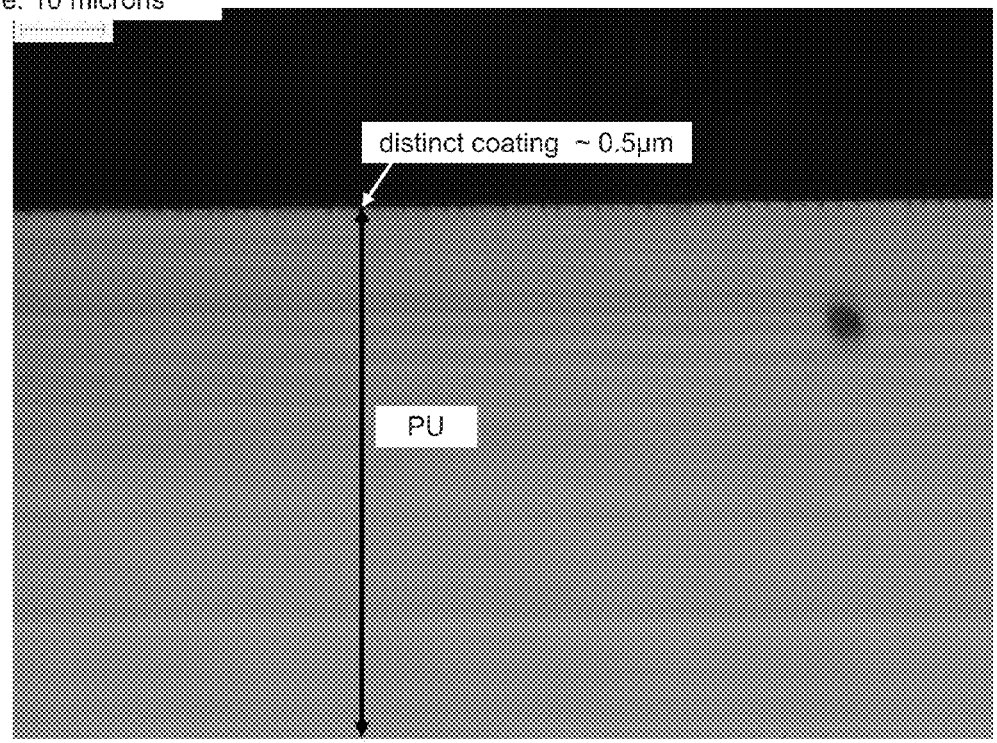
FIG. 11 is photomicrograph showing an exemplary sample film treated with an exemplary treatment solution prepared in accordance with the present inventive subject matter.

With reference now to FIGS. 10 and 11, photomicrographs show penetration or migration of the treatment solution into various films as indicated. In both cases, the same wet coating weight of the 1st exemplary treatment solution was applied to a 2nd exemplary PU film and to a Melinex™ PET film for comparison. Notably, as shown in FIG. 10, a significant distinct layer (i.e., of about 7 μm) forms on and/or over the surface of the PET film. However, as shown in FIG. 11, a substantially less thick layer (i.e., of about 0.5 μm) is so formed on and/or over the surface of the PU film. As can be appreciated, this is due to the significant migration or penetration of the treatment below the surface of the PU film in the latter example. Here more than 90% of the coating ingredients have diffused into the PU film. Optionally, layer formed on and/or over the surface of the PU film is less than or equal to about 2 microns. Alternately, the thickness of the coating which remains on the surface of the PU film is between about 0.5 μm and about 3 μm. In still a further embodiment, the coating which remains on the surface of the PU film is between about 0.5 μm and about 1.0 μm.

Figure 12:
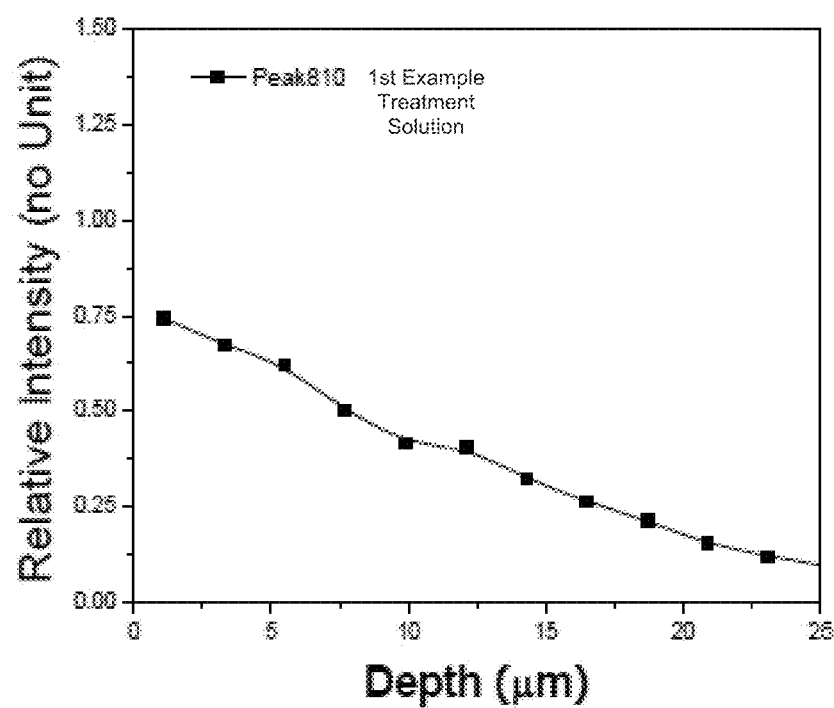
FIG. 12 is graph showing the relative intensity of a spectral analysis peak associated with an exemplary treatment solution prepared in accordance with the present inventive subject matter as a function of depth into an exemplary film receiving the treatment.

With further reference to FIG. 12, FTIR imaging analyses were performed to study the penetration, diffusion and/or migration of the $1^{st}$ exemplary treatment solution into the treated PU film shown in FIG. 11. The samples were cut into slices of about 15 to 20 um thick and analyzed by an ATR Imaging system (Perkin Elmer Spotlight 400) with a pixel size 1.56 μm. The FTIR images were collected with a spectral resolution of 4 cm$^{-1}$ and a spatial resolution of about 3 um. For 400×400 μm$^2$ image dimension, 2 scans were average at each point, while for 25×85 μm$^2$ image dimension, 32 scans were average at each point in order to obtain better quality spectra. The IR absorption peak at 810 cm$^{-1}$ associated with the unreacted double bond from the Sila Max™ treatment solution is used as representative of the Sila Max™ coating materials. The IR absorption peak at 779 cm$^{-1}$ associated with the C-H out of plane bending deformation is used to represent the PU materials.

As shown in FIG. 12, the relative peak intensity of 810 cm$^{-1}$ to 779 cm-$^{-1}$ falls off gradually with increased depth but remains visible up to at least 25 μm. Accordingly, this indicates that the treatment solution penetrates, diffuses or migrates into the PU film to a depth of at least 25 μm with a concentration that gradually decrease from the surface of the PU film to deeper within the PU film.

In accordance with one exemplary embodiment, it is suitable that the surface treatment penetrates, diffuses or migrates as much as 25 μm into the film. In yet another suitable embodiment, the surface treatment penetrates, diffuses or migrates as much as 50 μm into the film. Suitably, the treatment solution migrates into or penetrates the film such that it has a concentration gradient that gradually decreases with the depth of penetration into the film.

Referring now again to FIG. 1, in use, the release liner 12 is removed from the construction and the PSA layer 14 is used to adhere the treated film 10 to the surface of a desired object with the treated surface 16 of the film 10 facing outward therefrom. For example, the film is optionally applied in this manner to an auto body surface or other like surface one wishes to protect. Significantly, due to the fact that stretchability, flexibility and/or extensibility is maintained, the film 10 can be readily and smoothly be applied to complex geometries and/or otherwise curved surface. Optionally, alternate means can be used to adhere or otherwise stick the film 10 to a desired surface. For example, in one alternate embodiment, an optionally adhesive free functional layer may be employed. In particular, a layer of silicone material with weak cohesion and/or low surface tension (i.e., excellent wettability) may be used. Accordingly, the functional layer easily spreads and/or conforms onto the surface of the object to which it is applied, and as air is squeezed out from between the functional layer and the object surface, a vacuum is created therebetween. This vacuum and/or the external air pressure act to hold the film 10 to the surface of the object. Of course, other adhesive free options known in the art may also be employed, e.g., such a gecko-mimetic functional material.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The laminate shown in FIG. 1 can be manufactured in different ways. In one embodiment, a 150 μm thick $2^{nd}$ exemplary PU film extruded onto a 2 mil thick polyester carrier is obtained from Argotec Inc. The PU film has the $1^{st}$ and $2^{nd}$ major surfaces. The $1^{st}$ major surface is exposed and the $2^{nd}$ major surface is attached to the polyester carrier. The $1^{st}$ exemplary Sila Max™ treatment solution was obtained from Chisso Corp. A solvent based PSA solution was also made. The PSA solution was first coated onto the $1^{st}$ major surface of the PU film and the solvent was eliminated by drying at high temperatures. The PSA coated PU film was subsequently laminated to a polyester release liner 12 as shown in FIG. 1 and the polyester carrier was peeled off. The $2^{nd}$ major surface of the PU film is now exposed. The Sila Max™ treatment solution was applied to the $2^{nd}$ major surface of the PU film, dried at high temperatures to eliminate the solvent and subsequently cured using a mercury UV lamp.

Optionally, the treatment may include thermal and/or radiation curing. Suitably, since the treatment solution diffuses into the underlying PU or other film 10, it is desirable that film 10 be at least partially transparent to the curing radiation so that the material diffused into the film receives and/or is otherwise exposed to the curing radiation.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A protective film comprising:
   a plastic film having a stretchability, and
   a surface treatment including one or more ingredients applied as a coating formulation to a major surface of said plastic film, wherein said one or more coating ingredients diffuses at least partially into the plastic film;
   wherein the stretchability of the plastic film is maintained after surface treatment and
   wherein, following the surface treatment, a defined boundary does not exist which divides the coating and film into separate distinct layers.

2. The protective film of claim 1, wherein said plastic film is extensible/stretchable at room temperature.

3. The protective film of claim 2, wherein the plastic film is a polyurethane (PU) film.

4. The protective film of claim 2, wherein the plastic film is a polyvinyl chloride (PVC) film.

5. The protective film of claim 1, wherein the coating formulation is solvent based.

6. The protective film of claim 1, wherein the coating formulation is radiation curable.

7. The protective film of claim 1, wherein the coating formulation is thermally curable.

8. The protective film of claim 1, wherein the coating formulation is both radiation and thermally curable.

9. The protective film of claim 1, wherein the coating formulation contains nano-sized particles including at least one of nano-sized organic particles, nano-sized inorganic particles, or nano-sized organic-inorganic hybrid particles.

10. The protective film of claim 6, wherein the coating formulation includes an aliphatic urethane acrylate.

11. The protective film of claim 9, wherein the coating formulation contains a material derived from a silsesquioxane compound.

12. The protective film of claim 5, wherein the solvent contains at least one of methyl isobutyl ketone, methyl ethyl ketone, or isopropyl alcohol.

13. The protective film of claim 3, wherein the coating formulation diffuses into the PU film carrying one or more coating ingredients therewith.

14. The protective film of claim 1, wherein at least 10% of the coating ingredients diffuse into the plastic film.

15. The protective film of claim 1, wherein at least 20% of the coating ingredients diffuse into the plastic film.

16. The protective film of claim 1, wherein at least 30% of the coating ingredients diffuse into the plastic film.

17. The protective film of claim 1, wherein at least 40% of the coating ingredients diffuse into the plastic film.

18. The protective film of claim 1, wherein at least 50% of the coating ingredients diffuse into the plastic film.

19. The protective film of claim 1, wherein the concentration of the coating ingredients diffused into the plastic film gradually decreases with depth into the plastic film.

20. The protective film of claim 1, wherein the diffusion of the coating ingredients into the plastic film creates a new composition for the coating layer above the plastic film which is different from the starting coating composition.

21. The protective film of claim 2, wherein the film after treatment with the coating can withstand at least 25% elongation without failing.

22. The protective film of claim 2, wherein the film after treatment with the coating can withstand at least 50% elongation without failing.

23. The protective film of claim 2, wherein the film after treatment with the coating can withstand at least 75% elongation without failing.

24. The protective film of claim 2, wherein the film after treatment with the coating can withstand at least 100% elongation without failing.

25. The protective film of claim 3, wherein the coating solution diffuses at least 25 µm into the PU film.

26. The protective film of claim 3, wherein a thickness of the coating which remains on the major surface of the PU film is less than or equal to about 0.5 µm.

27. The protective film of claim 3, wherein a thickness of the coating which remains on the major surface of the PU film is between about 0.5 µm and about 3 µm.

28. The protective film of claim 3, wherein a thickness of the coating which remains on the major surface of the PU film is between about 0.5 µm and about 1 µm.

29. The protective film of claim 3, wherein a wet coat weight of the coating solution is between about 0.1 microns and about 25 µm.

30. The protective film of claim 6, wherein the plastic film is at least partially transparent to the curing radiation.

31. The protective film of claim 1, wherein the surface treatment improves the chemical resistance of the film.

32. The protective film of claim 1, wherein the surface treatment significantly reduces the surface energy of the film.

33. The protective film of claim 1, wherein the protective film after surface treatment has a stain resistance which is significantly better than the uncoated film.

34. A laminate constructed from the protective film of claim 1.

35. The laminate of claim 34, wherein the protective film is laminated to a release liner coated with a pressure sensitive adhesive (PSA).

36. The laminate of claim 35, wherein the protective film is self-wound and has no release liner.

37. The laminate of claim 35, wherein the protective film is laminated to a substantially adhesive free functional layer for securing the laminate to a surface of an object.

* * * * *